United States Patent
Cresens et al.

(10) Patent No.: US 10,127,642 B2
(45) Date of Patent: Nov. 13, 2018

(54) METHOD FOR CORRECTING DEFECTIVE PIXEL ARTIFACTS IN A DIRECT RADIOGRAPHY IMAGE

(71) Applicant: AGFA NV, Mortsel (BE)

(72) Inventors: Marc Cresens, Mortsel (BE); Herman Van Goubergen, Mortsel (BE)

(73) Assignee: AGFA NV, Mortsel (BE)

( * ) Notice: Subject to any disclaimer, the term of this patent is extended or adjusted under 35 U.S.C. 154(b) by 0 days.

(21) Appl. No.: 15/533,677

(22) PCT Filed: Dec. 10, 2015

(86) PCT No.: PCT/EP2015/079213
§ 371 (c)(1),
(2) Date: Jun. 7, 2017

(87) PCT Pub. No.: WO2016/091999
PCT Pub. Date: Jun. 16, 2016

(65) Prior Publication Data
US 2017/0345134 A1    Nov. 30, 2017

(30) Foreign Application Priority Data
Dec. 12, 2014    (EP) .................................... 14197652

(51) Int. Cl.
G06K 9/00    (2006.01)
G06T 5/00    (2006.01)
A61B 6/00    (2006.01)

(52) U.S. Cl.
CPC .... *G06T 5/005* (2013.01); *G06T 2207/10116* (2013.01); *G06T 2207/20012* (2013.01); *G06T 2207/20028* (2013.01); *G06T 2207/20032* (2013.01)

(58) Field of Classification Search
CPC ................ G06K 9/00; G06T 5/00; A61B 6/00
USPC ....... 382/128, 129, 130, 131, 132, 133, 134; 378/23, 28
See application file for complete search history.

(56) References Cited

U.S. PATENT DOCUMENTS

| | | |
|---|---|---|
| 2003/0179418 A1 | 9/2003 | Wengender et al. |
| 2007/0030365 A1* | 2/2007 | Jerdev .................... H04N 5/367 348/241 |
| 2008/0231734 A1 | 9/2008 | Enomoto |

OTHER PUBLICATIONS

Official Communication issued in International Patent Application No. PCT/EP2015/079213, dated Mar. 8, 2016.

* cited by examiner

*Primary Examiner* — Abolfazl Tabatabai
(74) *Attorney, Agent, or Firm* — Keating and Bennett, LLP

(57) ABSTRACT

A method for reducing image disturbances caused by reconstructed defective pixel clusters located in signal-gradient affected diagnostic image regions. An individually adapted central symmetrical pair reconstruction (CSP) kernel is composed for a defective image pixel based on a kernel-pair candidate order encoded in a model thereby using the pixel's validity state. The image impacted by defective pixels is corrected in real-time by statistical filtering or spatial convolution of the kernel-associated image data accessible via a predetermined CSP kernels image-offsets structure.

11 Claims, 13 Drawing Sheets fig. 7a
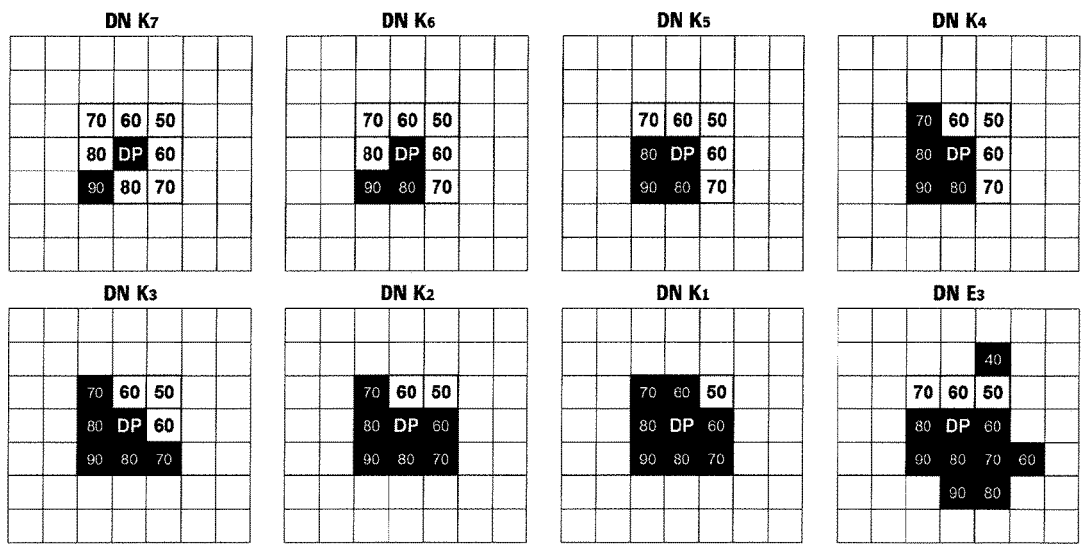
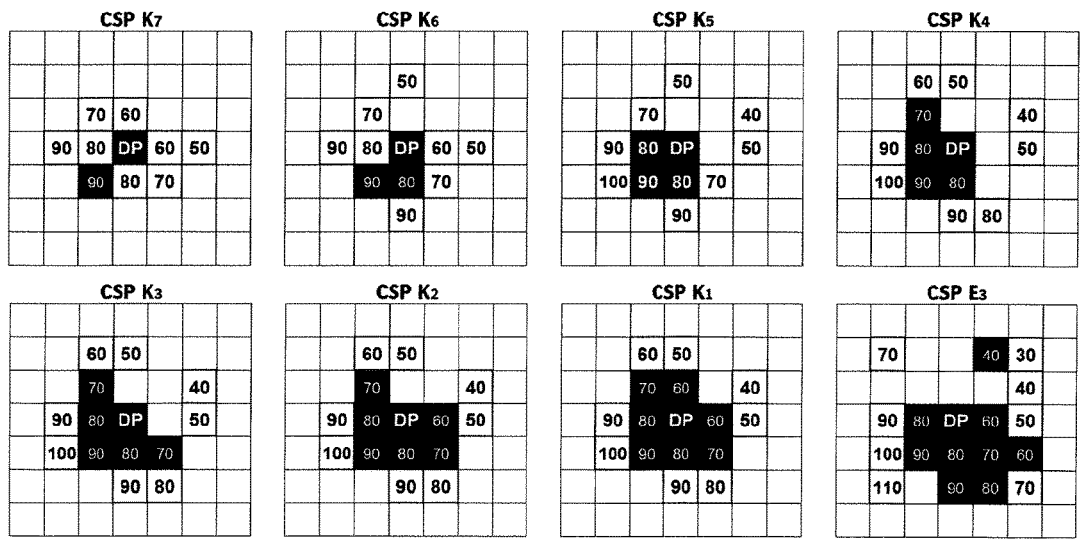

fig. 8

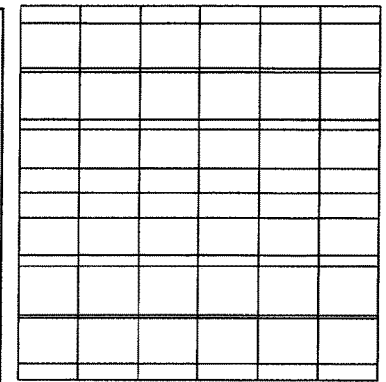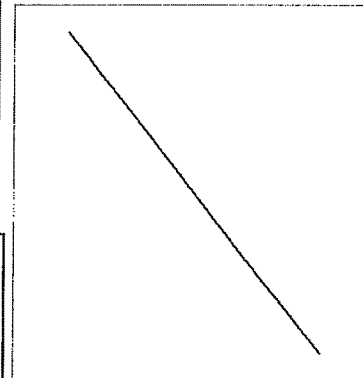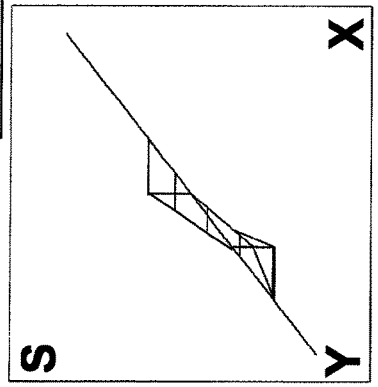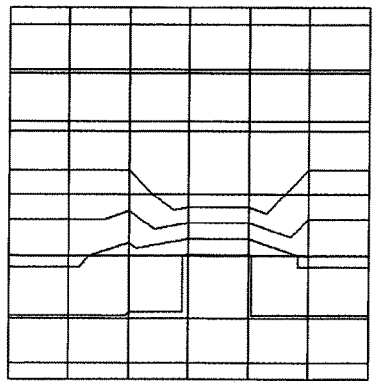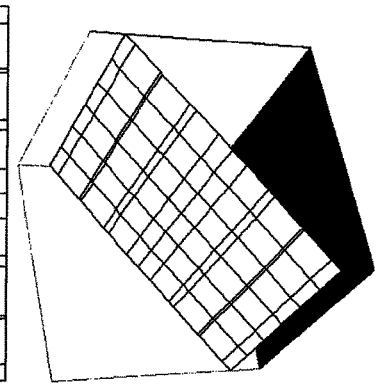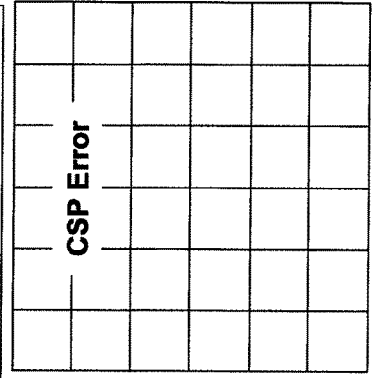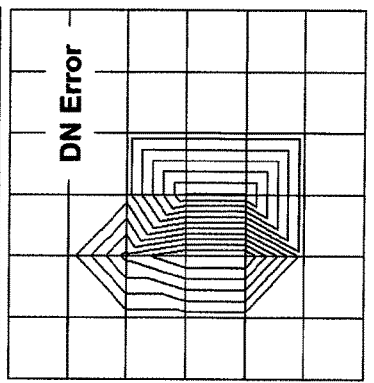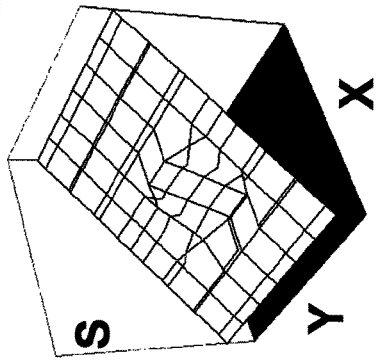
fig. 11
LINEAR Slope 0 degr.
Center Symmetrical Pair
Local Pixel Data
Defective Cluster Kernel Median Reconstruction
Direct Neighbor

METHOD FOR CORRECTING DEFECTIVE PIXEL ARTIFACTS IN A DIRECT RADIOGRAPHY IMAGE

CROSS REFERENCE TO RELATED APPLICATIONS

This application is a 371 National Stage Application of PCT/EP2015/079213, filed Dec. 10, 2015. This application claims the benefit of European Application No. 14197652.2, filed Dec. 12, 2014, which is incorporated by reference herein in its entirety.

BACKGROUND OF THE INVENTION

1. Field of the Invention

The present invention relates to direct radiography. The invention more particularly relates to a method for correcting defective pixel image artifacts in such a way that the visibility of reconstructed defective pixel clusters located in image-regions with strong signal-gradients is significantly reduced.

2. Description of the Related Art

Static and dynamic flat panel detector based x-ray imaging systems are commonly used in various application areas ranging from non-destructive testing to medical diagnosis. Although these complex, solid state sensor based image-acquisition devices are calibrated on a regular basis to determine and compensate for the various sources of spread in the signal conversion characteristics of their sensor-pixels, array-wise arranged in the detector's sensitive entry-surface, some of these sensor-pixels are defective or behave irregular causing their image-data to be non-representative for the amount of light or x-rays they have been exposed to during signal integration.

The majority of these unreliable sensor-pixels, often referred to as defective pixels generating invalid image-data, are isolated pixels which are distributed across the surface of the array-sensor.

Direct neighbor kernel based reconstruction algorithms making use of the eight non-defective image-data immediately surrounding the isolated defective pixel are sufficient to calculate a very effective replacement value for the defective pixel.

The defective pixel becomes well hidden after reconstruction and its uncorrected image-artifact, the local image-impact, disappears nearly completely.

Even when the reconstruction value of that isolated pixel might slightly differ from its normal value, the image data generated at that specific image-location in case the sensor-pixel wouldn't have been defective, a small reconstruction error, the deviation between the replacement value and the normal value, still remains hardly detectable in the corrected image.

Depending on the nature and the type of the physical phenomenon which is responsible for the invalid or unstable exposure-response of a defective pixel, groups of clustered defective pixels with various shapes and spatial extent are inevitably generated too. The image-impact of defective clusters is larger since multiple closely grouped image-pixels are affected is a small image-region.

Even when a reconstruction value is calculated for each individual defective pixel in the cluster, the reconstruction requirements shouldn't be less severe than those applicable for the reconstruction of an isolated defective pixel because a group of clustered pixels exhibiting small reconstruction errors will more likely be regarded as an artificial and thus disturbing, visible image-artifact, revealing the cluster's inadequately hidden presence and size.

This phenomenon becomes even worse if the defective cluster is surrounded by image-data showing a signal-slope profile due to the presence of a local signal-gradient often induced by to the sudden, step-shaped contrast differences at the boundaries of radiographed objects with substantially different x-ray absorption properties like bone and soft tissue.

Due to the grouped presence of other defective pixels in the immediate neighborhood of one of the defective pixels under reconstruction, the residual direct neighbor kernel or the side-wise extended kernel from which the replacement value is calculated loses geometrical balance relative to its reconstruction point and is drawn towards a spatial region with on average higher or lower image-data.

As a result the replacement value obtained for the defective pixel will generate a larger reconstruction error producing a local dented disturbance in the often fairly straight iso-contour lines thus making it even more difficult to hide the defective pixel cluster.

SUMMARY OF THE INVENTION

Preferred embodiments of the invention reconstruct defective pixel clusters located in image-regions affected by signal-gradients in the best possible way to optimally reduce their disturbing or miss-leading image-impact in order to improve the workflow and the quality of the visual inspection performed after diagnostic image acquisition.

The above-mentioned aspect is realized by a method having the specific method steps set out below.

Specific features for the preferred embodiments of the invention are also set out below.

With the method of the present invention it will be possible to obtain a high quality reconstruction of defective flat panel detector pixel-clusters especially when they are located in image-regions affected by signal gradients.

A preferred embodiment of the invention focuses on the composition of an adaptive, geometrically balanced reconstruction kernel. The goal is to keep the center-of-mass of the kernel-elements all associated with non-defective, valid image-data exactly centered on the reconstruction point (the location of the defective image pixel for which a replacement value must be determined) and this for any possible defective cluster shape.

In a preferred embodiment, the method relies on defective pixel location information derived from a predetermined defective pixels structure and on a center symmetrical pair model describing the geometries of the kernel pixel candidates and their pair-wise linking as a function of the sequence in which their spatially associated image-data is checked for validity.

Each defective image pixel receives its own spatially adapted reconstruction kernel which is composed of a pre-determined number of center symmetrical kernel pairs picked from the model. The entire set of adaptive Central Symmetrical Pair (CSP) reconstruction kernels needed the correct the defect impacted image is stored in a kernel geometry structure.

The spatial data contained in the defective pixels structure is merged with the adaptive center symmetrical pair kernel descriptions in the kernel geometry structure to upfront create an image-offset table for fast image-data access during real-time defective pixels reconstruction.

Statistical filtering or spatial convolution of the reconstruction kernel associated image-data is used to calculate the replacement values for the defective image pixels.

This statistical filtering process may comprise calculating the median value of the image data associated with said kernel.

In another embodiment the reconstruction algorithm performs a spatial convolution process on the image data spatially associated with said locations in said adaptive kernel using associated kernel-weights.

The spatial convolution may comprise a calculation of the average value of the image data associated with said adaptive kernel.

The average value is preferably a weighed average value of the image data associated with said adaptive kernel using corresponding kernel weights.

The weights of the various relative locations in said adaptive reconstruction kernel are preferably determined based on a relative distance model. Preferably a kernel location weight in the relative distance model decreases with increasing distance between said kernel location and the center of said reconstruction kernel.

The information on the defect state of image pixels surrounding said defective pixel is extracted from a defective pixel locations structure.

The defective pixel locations structure according to a preferred embodiment of the invention may be updated periodically or after maintenance, repair or move of the x-ray imaging system.

In one embodiment the set of center symmetrical pairs is composed by order-consecutively selecting a predetermined number of kernel-pair candidates from a center symmetrical pair model based on the defect state of their kernel-pair associated sensor pixels.

The center symmetrical pair model may be arranged as an order-sorted set of kernel pair candidates geometrically defined by their eccentricities and angular directions relative to the center of the reconstruction kernel.

In one embodiment the center symmetrical pair eccentricity is defined such that the distance from the kernel center never decreases with the sorting-order.

The initial center symmetrical pair eccentricity may equal one pixel.

In a specific embodiment the center symmetrical pairs angular directions are mutually perpendicular per set of two order-sorted kernel pairs candidates.

In an embodiment of this invention the image-position information derived from the defective pixel locations structure is merged with the image-position information derived from the center symmetrical pair kernels structure to upfront create an image-offsets structure.

In a further embodiment an upfront created image-offsets structure is used during adaptive center symmetrical pair defective pixel reconstruction to convert the defective pixel impacted image into a defective pixel corrected image.

In a preferred embodiment, the present invention can be implemented as a computer program product adapted to carry out all aspects of the method of the present invention when run on a computer. The invention also comprises a computer readable medium comprising computer executable program code adapted to carry out the steps of the method of the present invention.

Further advantages and embodiments of the present invention will become apparent from the following description and drawings.

BRIEF DESCRIPTION OF THE DRAWINGS

FIGS. 7a and 7b illustrate the geometrical differences between CSP-based and Direct Neighbor (DN)-based reconstruction kernels for various defective pixel clusters.

FIG. 8 shows a directed defective pixels cluster implanted in multiple local data patches containing linear slope signals according to various signal gradient directions.

FIG. 11 shows the difference between a center symmetrical pair kernel-median and a direct neighbor kernel median defective cluster-reconstruction and the differences between their reconstructed cluster-errors calculated in FIG. 9 and FIG. 10.

DETAILED DESCRIPTION OF THE PREFERRED EMBODIMENTS

An x-ray or light sensitive array-sensor, a crucial opto-electronic component of each flat panel detector system, acts as a planar transducer which converts the spatial distribution of the time-integrated impinging x-ray radiation captured at pixel resolution into a set of digital data which can be exported as an uncorrected image.

To be able to do this the large-area array-sensor is often built up as a stack of contacting and or fused layers.

A scintillator material arranged at the radiation entry side of the detector is used as a first layer to convert impinging x-rays into emitted light.

The electronic array-layer consists of photo-sensitive pixel-elements like reverse biased PIN diodes which convert the locally impinging emitted light into electric charge carriers which can be captured during time integration and locally stored in the pixel as an x-ray exposure representative charge-package.

A third layer carries a vast array of electronic switches used to transfer the captured charge towards read-out and conversion electronics as indicated by the read-out control signals.

Additional intermediate and external layers with leads and electrodes often arranged in a column- and row-wise patterns are added to interconnect the electronic components arranged in the various layers with each other, with the switching lines, with the charge-collecting lines and with the pixel's other control lines.

Direct conversion x-ray sensors as used in amorphous selenium based detector systems don't require a scintillator layer to convert the x-rays into charge-carriers and are built up differently.

In such system defects as described higher may appear and may require adequate correction.

Figure 1:
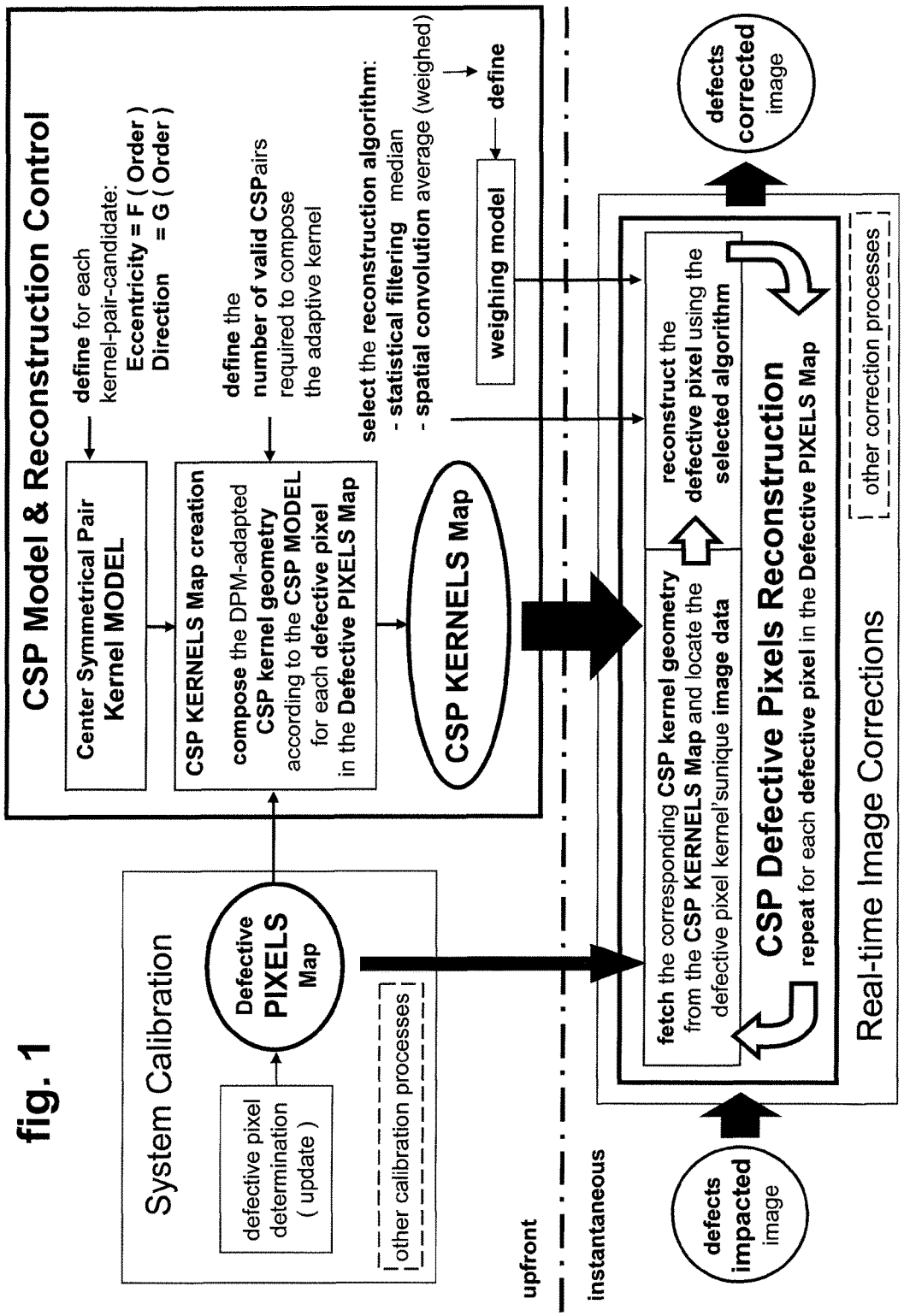
FIG. 1 depicts the Center Symmetrical Pair based defective pixels reconstruction process diagram including its related data structures, model and parameter controls.

FIG. 1 illustrates the Center Symmetrical Pair based defective pixels reconstruction process according to the present invention including the related data structures, model and parameter controls.

Upon initial calibration of a flat panel detector based direct radiography system in the factory as well as during acceptance testing, periodic quality control or after repair or move of the system in the field a data-validity structure indicating the defective or non-defective state of each individual sensor-pixel as a function of its location in the sensor-array image, named Defective PIXELS Map here, is actualized.

This updating of the data-validity state structure can be executed as a separate defective pixel determination process but is often part of the upfront-executed, off-line calibration activities performed periodically as a prerequisite activity to ensure an adequate, instantaneous defective pixel correction of acquired images at any time.

For each invalid flat panel sensor pixel, flagged in the Defective PIXELS Map as defective or exhibiting temporal or thermal instability, a defective pixel reconstruction value must be calculated during real-time reconstruction to replace the spatially corresponding image-data in the defects impacted image.

To be able to reconstruct a local defect the reconstruction process must know its defective pixel-location, which kernel-size and adapted kernel-geometry must be used and what type of reconstruction operation must be performed on the adaptive kernel-associated image-data.

All this information is provided upfront by the CSP Model & Reconstruction Controls block.

By defining the eccentricity and the direction of each candidate kernel pixel relative to the kernel-center as a function of the order in which some kernel-pixel candidates are consecutively evaluated a Center Symmetrical Pair Model acting as a kernel composition scheme is created.

The amount of valid CSP kernel pairs required to compose an adaptive reconstruction kernel is defined next. For each element in the Defective PIXELS Map a geometry-adapted CSP kernel description is composed and added to the CSP KERNELS Map structure.

The decision on the reconstruction algorithm to be used during real-time defective pixel reconstruction depends on a selection made upfront. Either a statistical filter operation like a median calculation of the adaptive kernel associated image-data or a spatial convolution operation like an average or a weighed average calculation of that image-data can be selected. In case a weighed average reconstruction is selected also the weighing model defining the various, different weights of the kernel elements according to their distance and direction relative to the kernel-center is predetermined.

The defective pixel reconstruction process is executed in real time as part of a set of instantaneously executed image correction activities necessary to calculate a defect corrected image with minimal processing-delay for each array-sensor frame presented to the image processing chain in a static single-frame or a dynamic multi-frame image acquisition mode.

The use of a predetermined, fast access, image-offset data-structure merging the spatial information derived from the Defective PIXELS Map with the spatial descriptions of the reconstruction kernel compositions significantly reduces the overall reconstruction delay by minimizing the inevitable time-loss associated with the vast number of image-data fetch and image-data replace operations executed while reconstructing the several thousands of defective or unreliable image-data per image-frame.

Figure 2:
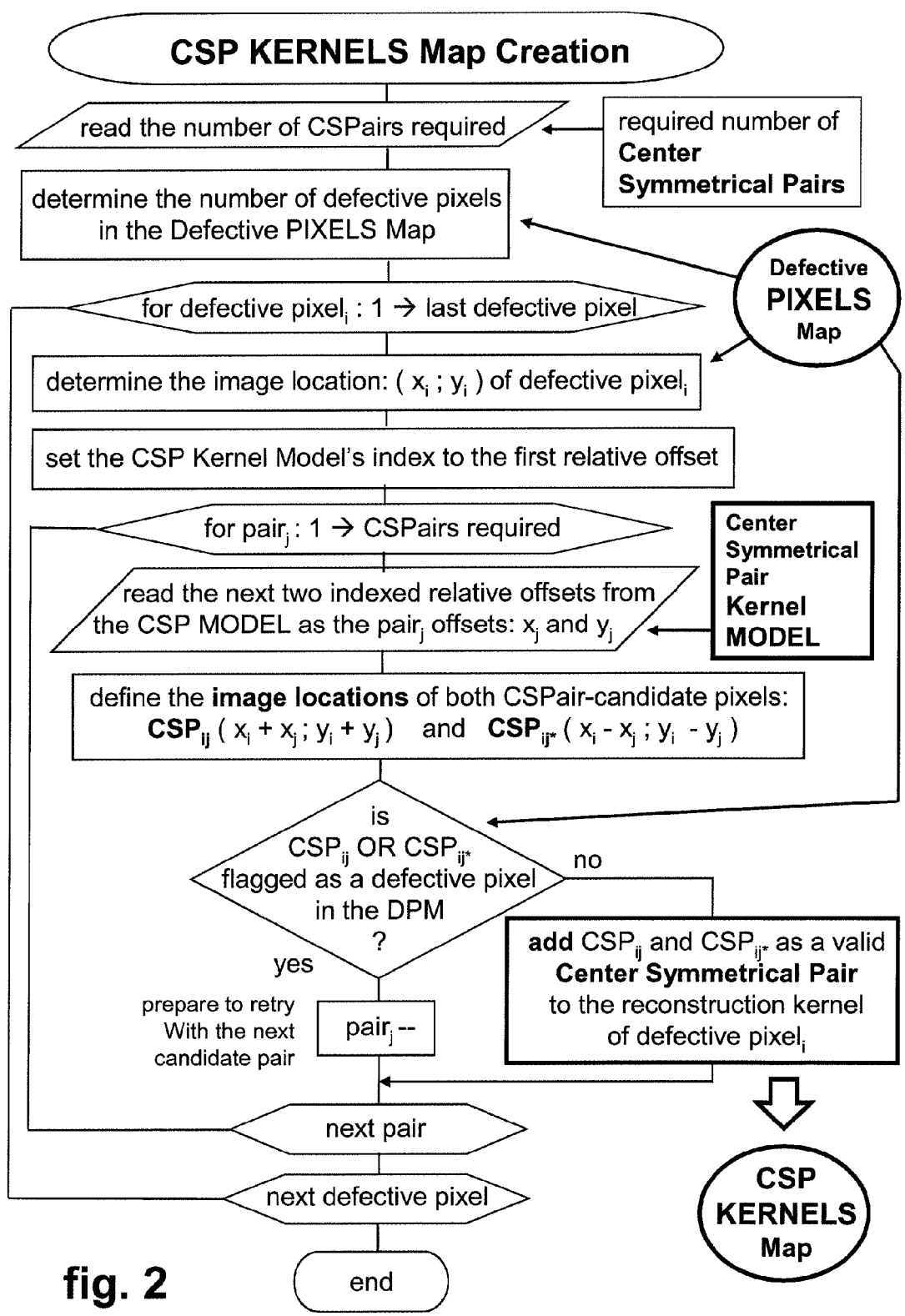
FIG. 2 is a flow chart illustrating the CSP Kernels Map creation.

FIG. 2 is a flow chart illustrating the CSP Kernels Map creation.

Prior to starting the process of CSP KERNELS Map Creation the number of Center Symmetrical Pairs required is known and the Center Symmetrical Pair MODEL and the Defective PIXELS Map must both be present.

The number of Center Symmetrical Pairs required is read and the total amount of defective sensor-pixels is determined by analyzing the Defective Pixels Map structure.

Next the following operations are executed loop-wise for every sensor-pixel flagged in the Defective PIXELS Map.

First the image-location of the defective $pixel_i$ $(x_i; y_i)$ is determined from the Defective PIXELS Map structure and the CSP Kernel Model index is reset to point to the kernel-offsets of the first kernel-pair candidate.

The $pair_j$ loop-counter, representing a fully valid CSP kernel pair to be detected, is set to 1.

A loop-wise executed search process examining the Defective PIXELS Map for the validity of image-data in the neighborhood of defective $pixel_i$ as a function of its associated kernel candidate evaluation order defined in the Center Symmetrical Pair MODEL is initiated.

Using the current $pair_j$ loop-counter index two relative kernel-offsets: $x_j$ and $y_j$ are read from the CSP MODEL and the $CSP_{ij}$ $(x_i+x_j; y_i+y_j)$ and $CSP_{ij^*}$ $(x_i-x_j; y_i-y_j)$ image-locations, spatially related to the indexed kernel-pair candidate under data-validity evaluation and thus point-symmetrically arranged around the reconstruction point, are defined.

If at least one of both image-locations occurs in the Defective PIXELS Map the kernel-pair candidate is excluded from the kernel composition process and the $pair_j$ loop-counter remains unchanged causing the search process to continue looking for that same $CSPair_j$ by evaluating the next kernel pair candidate in the CSP Model.

If on the contrary both image-locations represent valid sensor-data their corresponding kernel-pair candidate offsets are added to the CSP KERNELS Map and the $pair_j$ loop-counter is incremented to start looking for $CSPair_{j+1}$ during the next passage through the search-loop.

As soon as the $pair_j$ loop-counter indicates that the required number of CSPairs has been detected the process of CSP kernel composition stops for that specific defective pixel and the $pixel_i$ loop-counter is incremented to initiate the adaptive CSPair kernel composition for the next defective pixel.

This loop-wise executed CSP KERNELS Map creation process which composes an adaptive CSP reconstruction kernel for each defective sensor-pixel terminates when the incremented defective $pixel_i$ loop-counter surpasses the number of Center Symmetrical Pairs required.

Figure 3A:
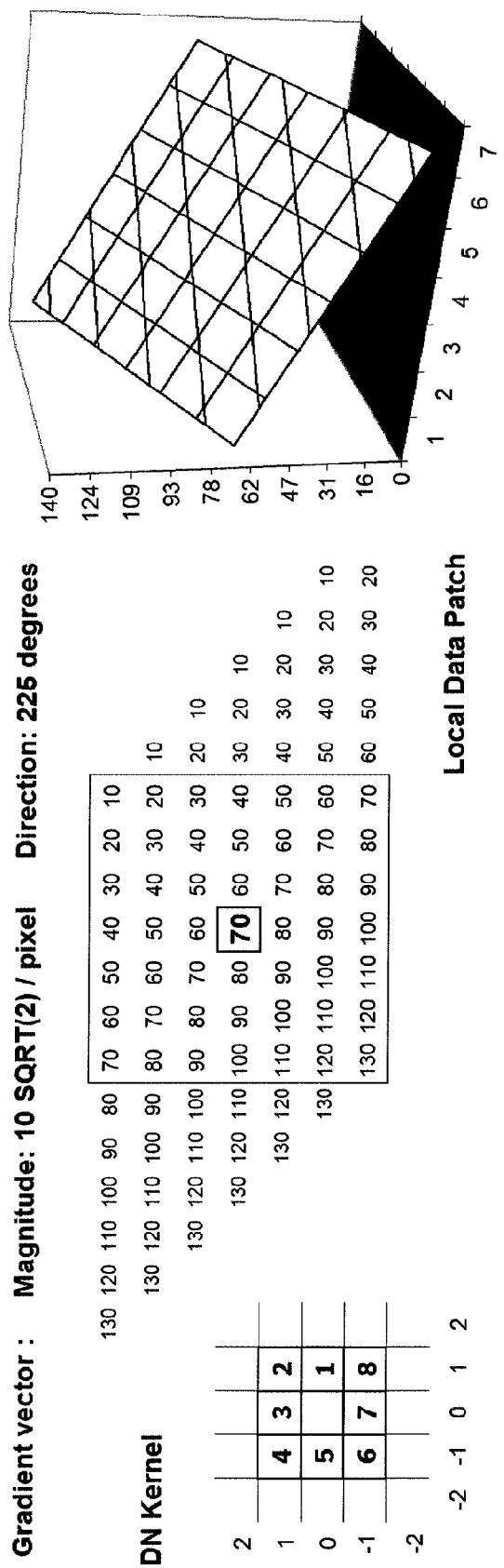
FIGS. 3a and 3b illustrate the calculation of Direct Neighbor based defective pixel reconstruction acting on linear slope image-data in combination with various defective pixel clusters.
Figure 3B:
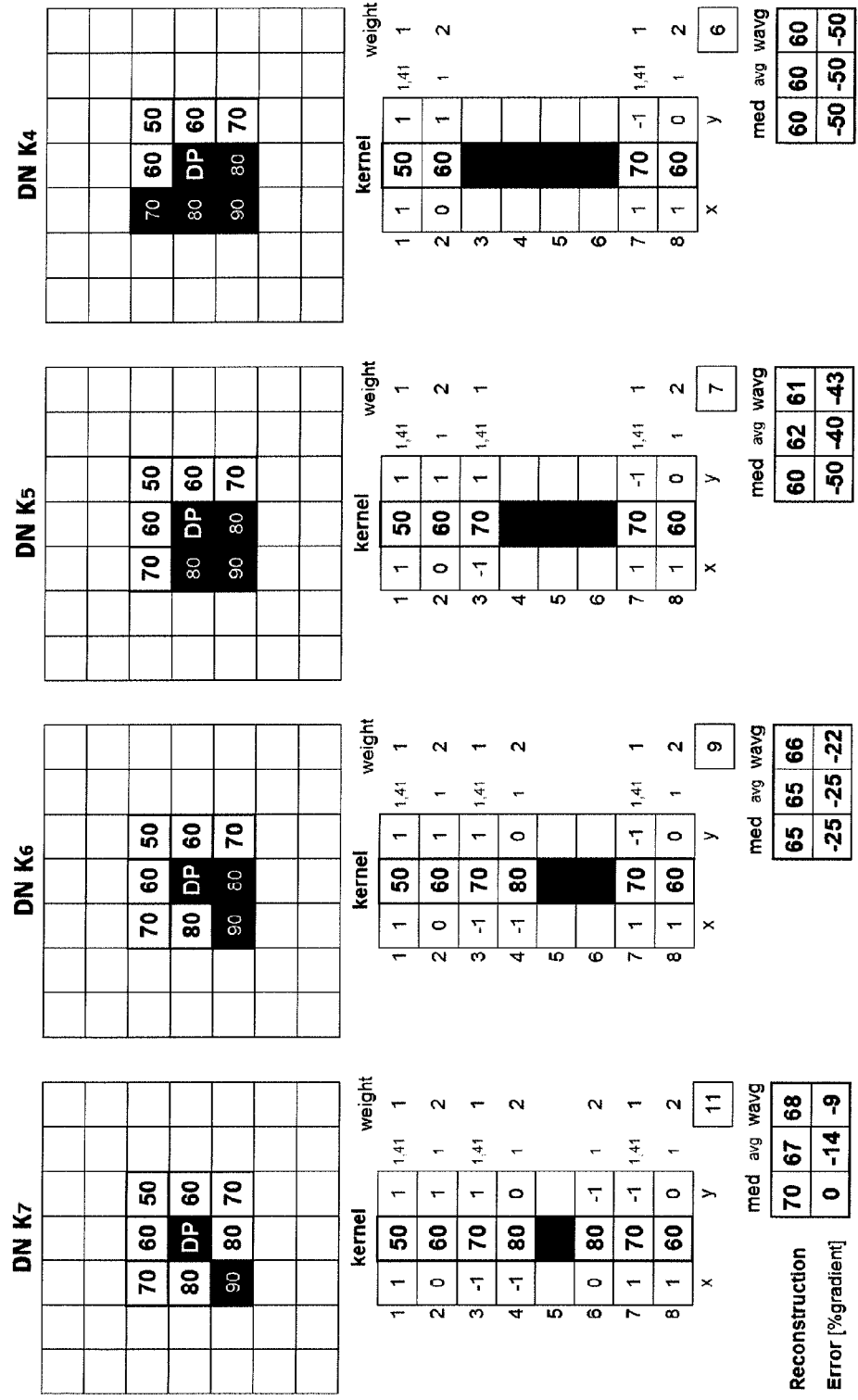

FIGS. 3a and 3b illustrate the calculation of Direct Neighbor based defective pixel reconstruction acting on linear slope image-data in combination with various defective pixel clusters.

The process of defective pixel reconstruction is explained for the defective sensor-pixel located in the center of a Local Data Patch, which simulates image-data with a constant signal gradient, by means of four different Direct Neighbor kernel reconstructions calculated for four differently sized and shaped defective pixel clusters.

In case of a single pixel image-defect the reconstruction kernel, the set of surrounding valid image-pixels from which a defect-correcting replacement value is calculated, is complete and composed of the 8 non-defective, side- and corner-wise directly touching neighbor pixels.

For the smallest possible defective pixels cluster one of the direct neighbor pixels of the central defective pixel will be defective too. This situation is represented by the black, invalidated, side-wise touching kernel pixel 5 in the overlay of the DN K7 kernel with the local data patch. As a result only 7 valid, direct neighbor pixels can be used to compose a partially defective, residual direct neighbor kernel.

Since kernel pixel 5 with image-data 90 is missing during the calculation of the reconstruction value for the central defective pixel, the thus obtained replacement value might differ from the normal replacement value 70 which would have resulted in case of a complete reconstruction kernel.

The calculation example also shows differences in the defective pixel reconstruction as a result of the reconstruction algorithm used.

Kernel-median (med) statistical filtering of the residual DN K7 kernel image-data results in a reconstruction value of 70 leading to a 0 reconstruction-error. Excluding the defective image-data associated with the missing kernel location 5 doesn't have an impact on the result of the reconstruction if a kernel median algorithm is used for this orientation of the local signal gradient.

Kernel-average (avg) reconstruction and kernel-weighed-average (wavg) reconstruction, both implementing a spatial convolution of the kernel weights and their associated image-data, lead to the lower replacement values: 67 and 68. This time the impact of on an additional defective pixel corner-contacting the central defective pixel generates the reconstruction-errors: −3 and −2 corresponding to a −14% and a −9% relative magnitude-change of the local signal-gradient.

This can also be regarded as virtual shift of the reconstruction point due to a center-of-mass shift of the residual reconstruction kernel towards the lower image data values on the linear signal slope as will be explained in FIG. 7.

As demonstrated by the three other smaller, residual direct neighbor kernels: DN K6 to DN K4, excluding 2 to 4 kernel-locations, the magnitude of the calculated reconstruction error increases with the dimensions of the defective cluster and depends on the algorithm and kernel weight model used during defective pixel reconstruction.

Figure 4:
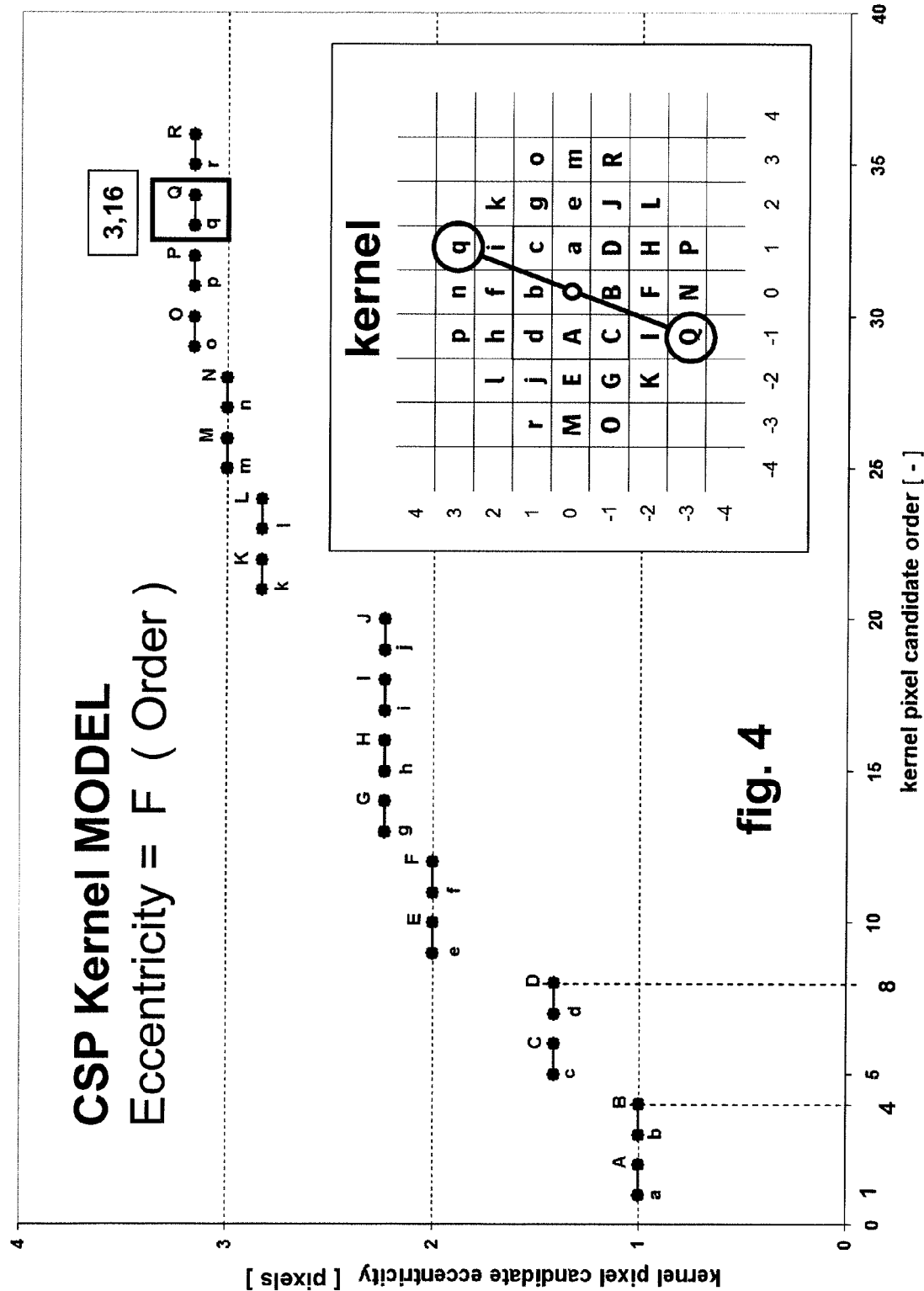
FIG. 4 shows an exemplary CSP kernel model implementation defining a candidate pair's eccentricity relative to the kernel-center as a function of its data-validity evaluation order.
Figure 5:
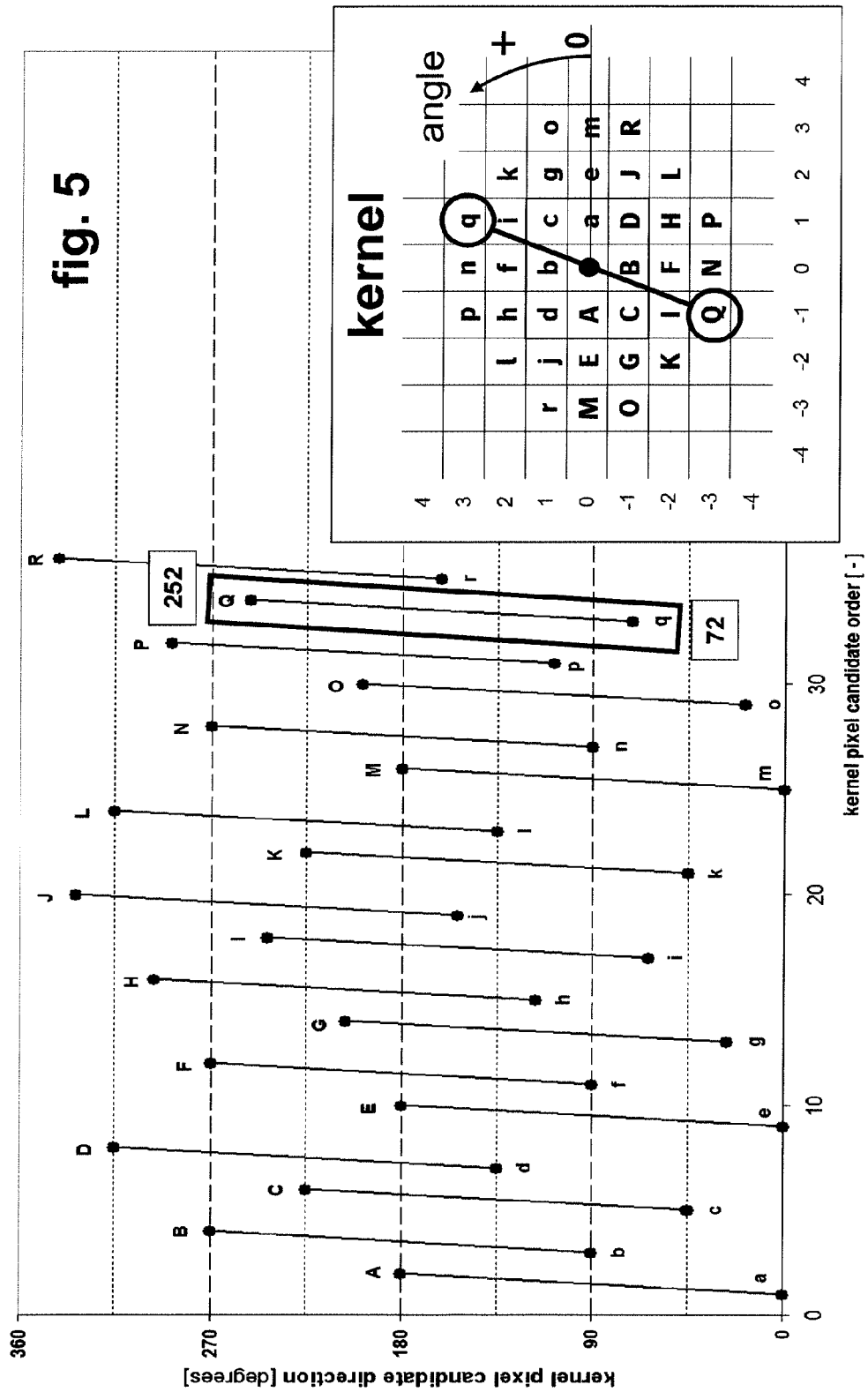
FIG. 5 shows an exemplary CSP kernel model implementation defining a candidate pair's angular direction relative to the kernel-center as a function of its data-validity evaluation order.

FIG. 4 shows an exemplary CSP kernel model implementation defining a candidate pair's eccentricity relative to the kernel-center as a function of its data-validity evaluation order and FIG. 5 shows an exemplary CSP kernel model implementation defining a candidate pair's angular direction relative to the kernel-center as a function of its data-validity evaluation order.

A possible, preferred implementation of a predetermined Center Symmetrical Pair kernel MODEL is represented in FIGS. 4 and 5.

The order in which the pixel-validity of image-data associated with the kernel pixel candidates is evaluated is represented by the character-sequence: a, A, b, B, c, C, . . . in the complimentary spatial kernel-view which defines the geometry of each kernel candidate location relative to the kernel-center. The kernel pixel candidates are pair-wise grouped such that their eccentricities relative to the kernel-center are equal and their angular directions are opposite to the reconstruction point acting as a point for symmetrical mirroring.

As an example the kernel pixels of the CSPair candidate qQ are located such that their eccentricities are equal to 3.16 pixels and their angular directions of 72 degrees and 252 degrees are in perfect opposition.

In addition this implemented sequence of CSPair candidates, from which only a predetermined number of pairs required is picked to compose an adaptive reconstruction kernel for each defective sensor pixel, starts with the candidate CSPairs: aA and bB both exhibiting the smallest possible eccentricity of 1 pixel and with mutually perpendicular angular directions.

If their four corresponding image pixels are evaluated as non-defective these CSPairs are located nearest to the defective pixel and will thus contribute with valid image-data representing the closest possible approximation of the missing image-data at the defective reconstruction point.

The relevance of neighboring image data for the reconstruction of a defective pixel decreases with its distance to the actual image-defect reflected by the eccentricity of the corresponding kernel location relative to the kernel-center.

For this reason the CSP Kernel MODEL's eccentricity-graph preferably starts at a 1 pixel distance from the image-defect and shows equal or increasing eccentricities as a function of the order in which its associated image-data is evaluated for validity.

To optimally preserve the isotropic character of the reconstruction kernel it is necessary that the set of CSPair candidates picked to compose an adaptive reconstruction kernel should represent a good directional balance of image data pairs surrounding the reconstruction point in various angular directions.

For this reason the CSP Kernel MODEL's direction-graph should preferably be such that the angular directions of the per 2 pairs grouped CSPair candidates are perpendicular. The direction-graph shown in the CSP model implements the following angular differences between the consecutive CSPair candidates: 90 degr.=bB-aA, −45 degr.=cC-bB, 90 degr.=dD-cC, −135 degr.=eE-dD, 90 degr.=fF-eE, −60 degr.=gG-fF, 90 degr.=hH-gG, .

This pair-wise kernel composition approach forces the adaptive reconstruction kernel to always consist of an even number of CSP kernel pixel candidates associated with non-defective image-data present in the neighborhood of a defective sensor-pixel.

Figure 6:
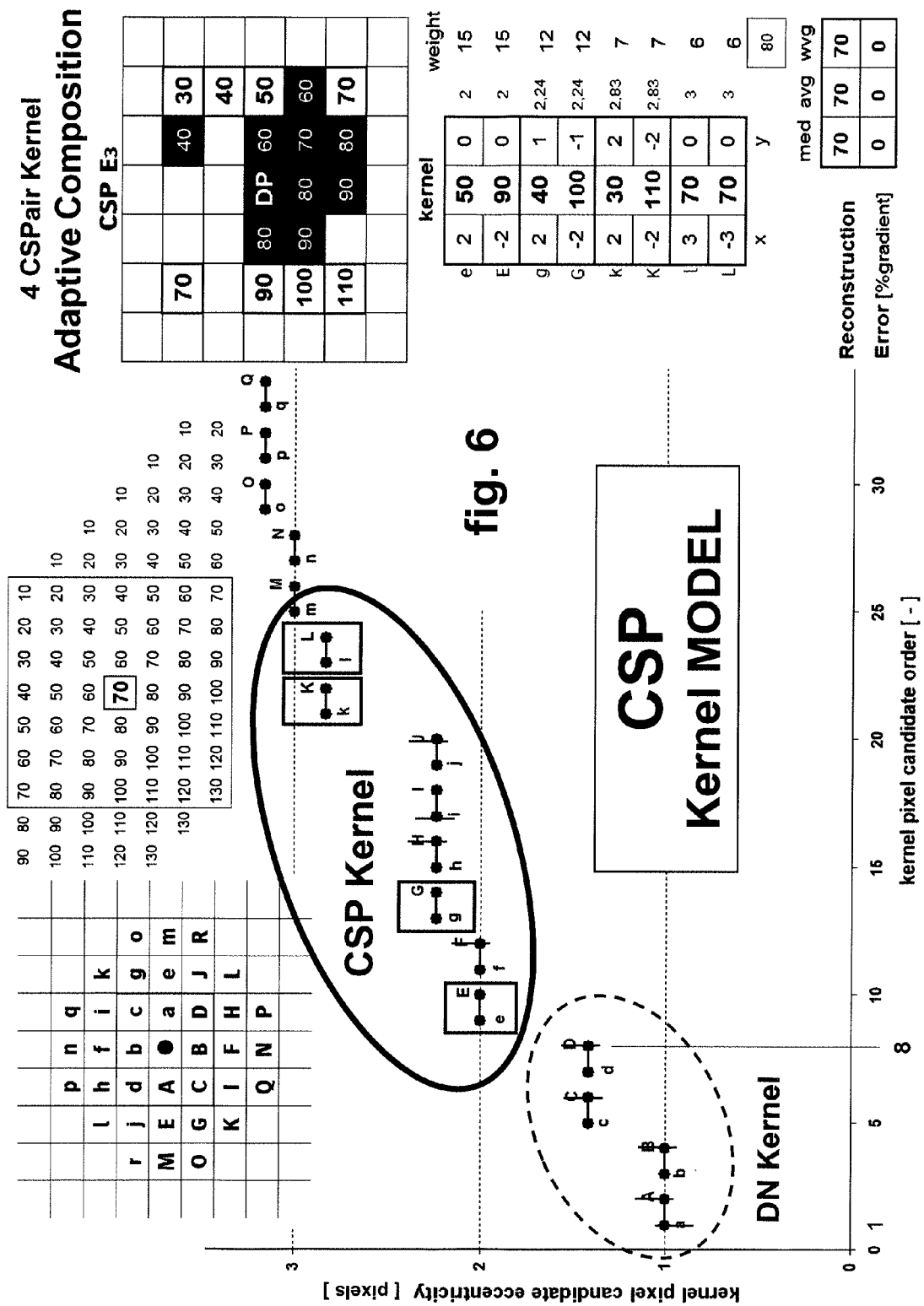
FIG. 6 illustrates the concept of CSP Kernel Model based adaptive kernel composition for a complex-shaped, defective pixels cluster.

FIG. 6 illustrates the concept of CSP Kernel Model based adaptive kernel composition for a complex-shaped, defective pixels cluster.

The same local image-data patch as seen in FIG. 4 and FIG. 5, showing a constant gradient linear signal-slope, is used as the non-defective image-data reference. The enlarged CSP E3 image-data view shows this reference image-data patch with a black overlay of the complex shape of a vast image disturbance caused by the complex geometry of 10 partially clustered defective sensor-pixels, for which the image locations are derived from the Defective Pixels Map.

The composition of an adaptive reconstruction kernel consisting of 4 CSPairs using information from the Defective PIXELS Map and from the CSP Kernel MODEL is explained here for a single defective sensor-pixel, part of the defective cluster, located in the center of the CSP E3 view and coinciding with the non-defect impacted reference signal value 70.

The CSP Kernel MODEL is represented by the spatial kernel candidates view, directly associated with the CSP E3 view, and by the kernel pixel candidate eccentricity graph.

The Kernel locations: 'a' and 'A', representing the first occurring kernel pair candidate in the CSP Kernel Model, are evaluated to find out whether or not their spatially associated image data is linked to defective sensor-pixels. The CSP E3 view's Defective PIXELS Map overlay shows that the kernel pixel candidates associated with the reference image-data: 60 and 80 are both marked black and thus linked to a defective sensor-pixel. By consequence the first CSPair candidate 'aA' is excluded from the adaptive kernel composition process. Next the second occurring kernel pair candidate 'bB' is evaluated. Although the kernel pixel candidate 'b' refers to reliable image data 60 since it is not related to a defective sensor-pixel, the pair 'bB' is excluded too because the kernel pixel candidate 'B' is associated with the black-marked image data 80 linked to a defective sensor-pixel thus making the pair only partially valid.

For the same reason also the third and the fourth CSP Kernel MODEL candidate pairs: 'cC' and 'dD' are excluded because their kernel pixel candidates: 'C' and 'D' are linked to a defective sensor-pixel.

The first CSPair candidate passing the data validity evaluation of its associated image data is: 'eE' because none of its kernel pixel candidates is linked to image data which is flagged as unreliable in the Defective PIXELS Map.

The accepted kernel pair's non-defective image-data values: 50, associated with the kernel pixel 'e', and 90, associated with kernel pixel 'E' are added as a first contributing CSPair to the reconstruction kernel's data table shown below the CSP E3 view.

Since four accepted CSPair candidates a required to complete the CSP kernel, the process of evaluating the consecutively occurring CSP Kernel MODEL candidate pairs will continue till three additional CSPairs, all referring to fully reliable image data, are found. The kernel candidate pairs 'gG', 'kK' and 'lL' all meet this evaluation criterion and their associated, valid image-data pairs: 40_100, 30_110 and 70_70 are added as second, third and fourth CSPairs to the kernel data table thus finalizing the composition of the adaptive CSP reconstruction kernel for the central defective pixel in the CSP E3 view.

Observing the adaptive CSP kernel finally obtained in the CSP E3 view we notice that non-defective local image-data, although it is closer to the reconstruction point, is excluded from contributing to the kernel-composition if its point-symmetrical counterpart at the opposite side of the defect is flagged as defective.

Analyzing the CSP Kernel Model Eccentricity graph we see that the obtained, adaptive CSP reconstruction kernel for the complex-shaped cluster, consisting of four fully valid center symmetrical pairs with elevated eccentricities ranging from 2 to 2.8 pixels, seriously deviates in shape and spatial extent from the adaptive 4 CSPairs kernel used to reconstruct an isolated, single pixel sensor-defect and identical to an 8 pixel Direct Neighbor (DN) reconstruction kernel.

Giving up image-data proximity for improved image-data balance at increased spatial extent while composing an adaptive reconstruction kernel is key to a significant reduction of image-artifacts generated by reconstructing defective pixel clusters which are located in image-areas with strong signal-gradients.

The CSP reconstruction value and its deviation from the original image data, obtained in case the sensor-pixel would not have been defective, are calculated in this composition example using kernel-median (med) statistical filtering as well as kernel-average (avg) and kernel-weighed-average spatial convolution.

Regardless of the reconstruction algorithm used to process the image-data present in the adaptive CSP kernel, a reconstruction value of 70 is always obtained for the central defective pixel of the complex-shaped defective cluster in the CSP E3 view. This reconstructed value equals the defect-less reference image data which means that none of these CSP reconstructions algorithms results in a visible reconstruction-error.

Figure 7B:
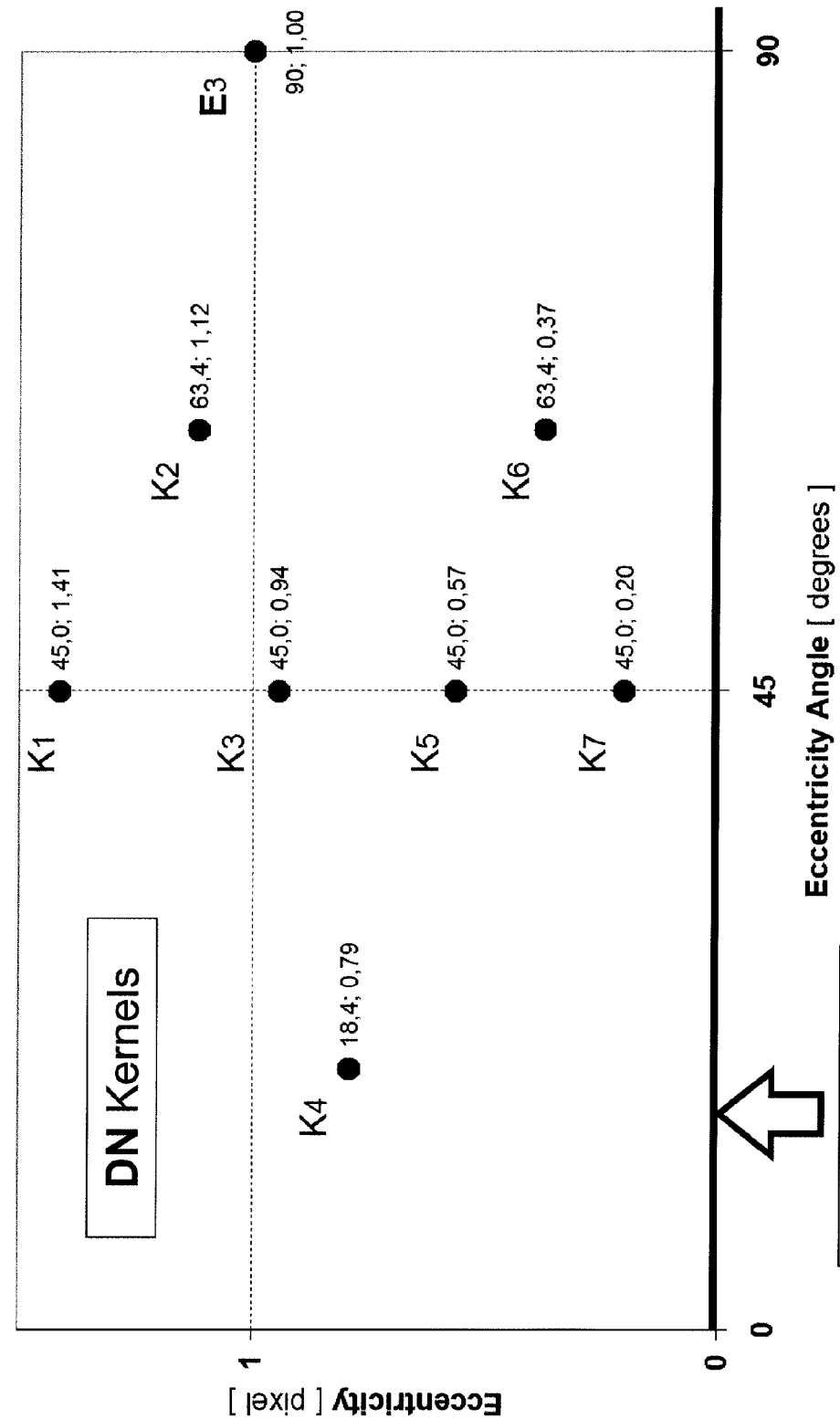

FIGS. 7a and 7b illustrate the geometrical differences between CSP-based and Direct Neighbor (DN)-based reconstruction kernels for various defective pixel clusters.

A set of 8 different, partially defective, residual Direct Neighbor reconstruction kernels named: DN K7 down to DN K1 and DN E3, related to the complex-shaped defective pixels cluster, are represented on top along with their corresponding, adaptive 4 CSPair kernels named: CSP K7 down to CSP K1 and CSP E3, for which the composition was explained in depth above, at the bottom.

Their central defective pixel for which the reconstruction value must be calculated obviously doesn't belong to any of the reconstruction kernels.

The Residual Reconstruction Kernel Geometry diagram plots the eccentricity and the eccentricity direction of the center-of-mass for each of these reconstruction kernels relative to the reconstruction point.

The least complete DN K1 kernel consists of a single kernel-element because its other seven invalidated direct neighbor kernel locations are all linked to defective pixels belonging to an 8 defective pixels cluster. The center-of-mass of this DN K1 kernel by consequence coincides with the location of the sole kernel pixel left. That location is characterized by a 45 degrees eccentricity-angle and a 1.14 pixel eccentricity and is represented by the 'K1'-labeled dot in the Residual Reconstruction Kernel Geometry diagram.

The DN K7 kernel represents the opposite situation where a very small defective cluster consisting of merely 2 defective pixels, including the central reconstruction point, invalidates only one of the 8 surrounding direct neighbor kernel location. The center-of-mass of that residual DN K7 reconstruction kernel, composed of the remaining seven non-defective kernel locations, is situated much closer to the reconstruction point now due to its 0.2 pixels eccentricity.

The 'E3'-labeled dot in the diagram represents the residual reconstruction kernel geometry of the complex-shaped direct neighbor kernel. The center-of-mass of the E3 kernel, consisting of three remaining kernel locations in the configuration shown, is characterized by its 1 pixel eccentricity and a 90 degrees eccentricity angle.

The center-of-mass of the residual DN reconstruction kernels is inevitably drawn towards the average clustering location of their remaining kernel locations thus creating eccentricity relative to the reconstruction point. The bigger this eccentricity of the residual direct neighbor kernel and the closer the eccentricity direction resembles the direction of the local signal-gradient, the larger the defective pixel reconstruction error will be if signal-slopes are present in the defective cluster impacted local image-data. Center symmetrical pair based adaptive kernel composition forces the center-of-mass of each CSP-kernel to always coincide exactly with the reconstruction point. This deliberately targeted, very specific, 'zero eccentricity' kernel-geometry is reflected by a line at the bottom of the diagram representing each adaptive CSP kernel with its undefined eccentricity angles.

Figure 8:
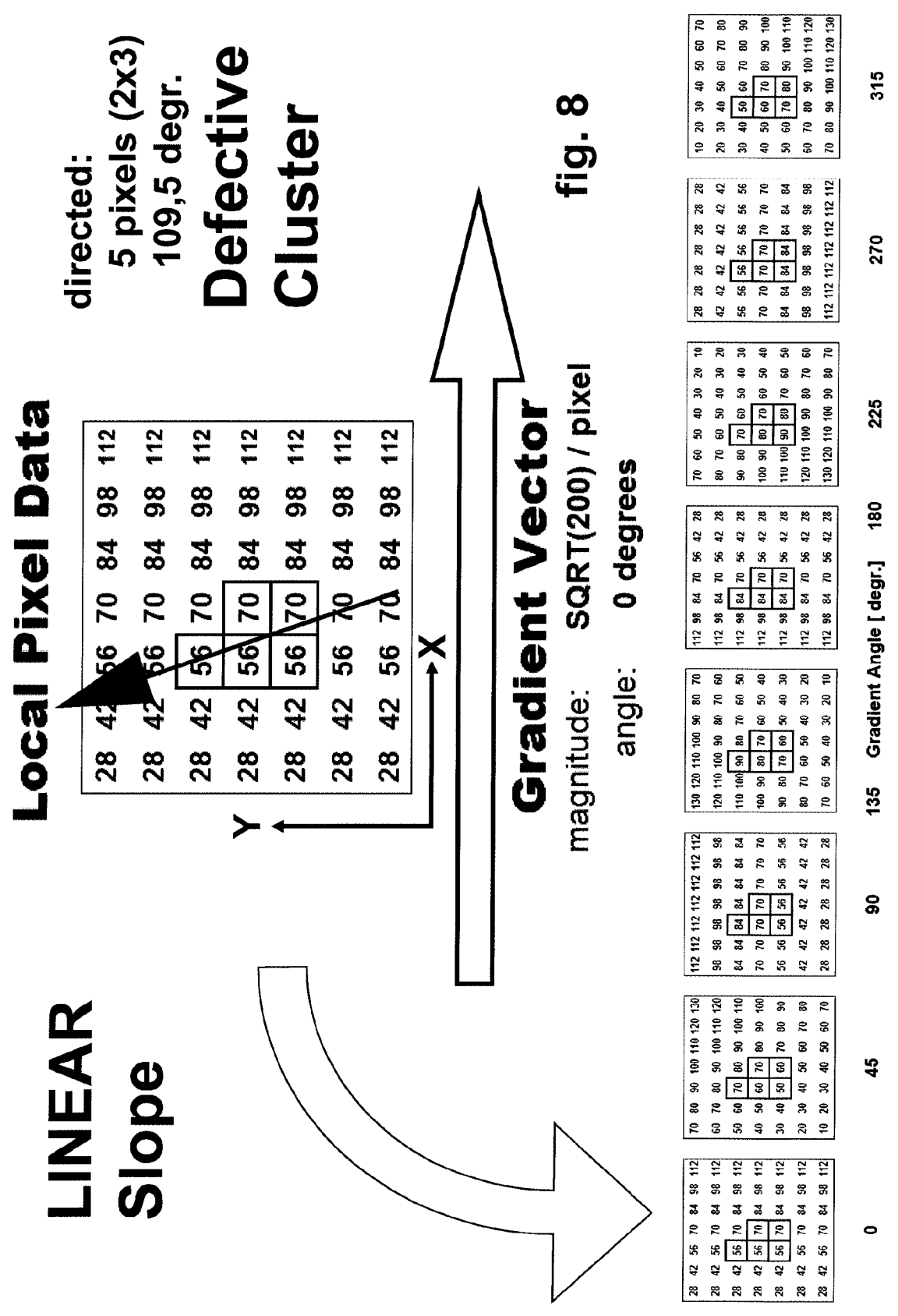

FIG. 8 shows a directed defective pixels cluster implanted in multiple local data patches containing linear slope signals according to various signal gradient directions.

Various local image-data patches exhibiting a steep, linear slope signal are generated for 8 evenly distributed, constant gradient-directions. The enlarged, zero degrees gradient angle view shows local pixel data for a signal-gradient with a magnitude of 14 units per pixel. The magnitude of the signal gradient in its various angular directions remains constant across each local image data patch shown. A directed, 109.5 degrees vector-inclined, defective 5 pixels (2×3) cluster, representing the spatially associated sensor-pixel validity state as derived from the Defective PIXELS Map, is virtually implanted into each local data patch at the same image-locations. The resulting set of defective cluster overlaid Local Data Patches, shown at the bottom, will serve as simulated image-data for direct neighbor kernel based defective cluster reconstruction in FIG. 9 and for adaptive central symmetrical pair kernel based defective cluster reconstruction in FIG. 10.

Figure 9:
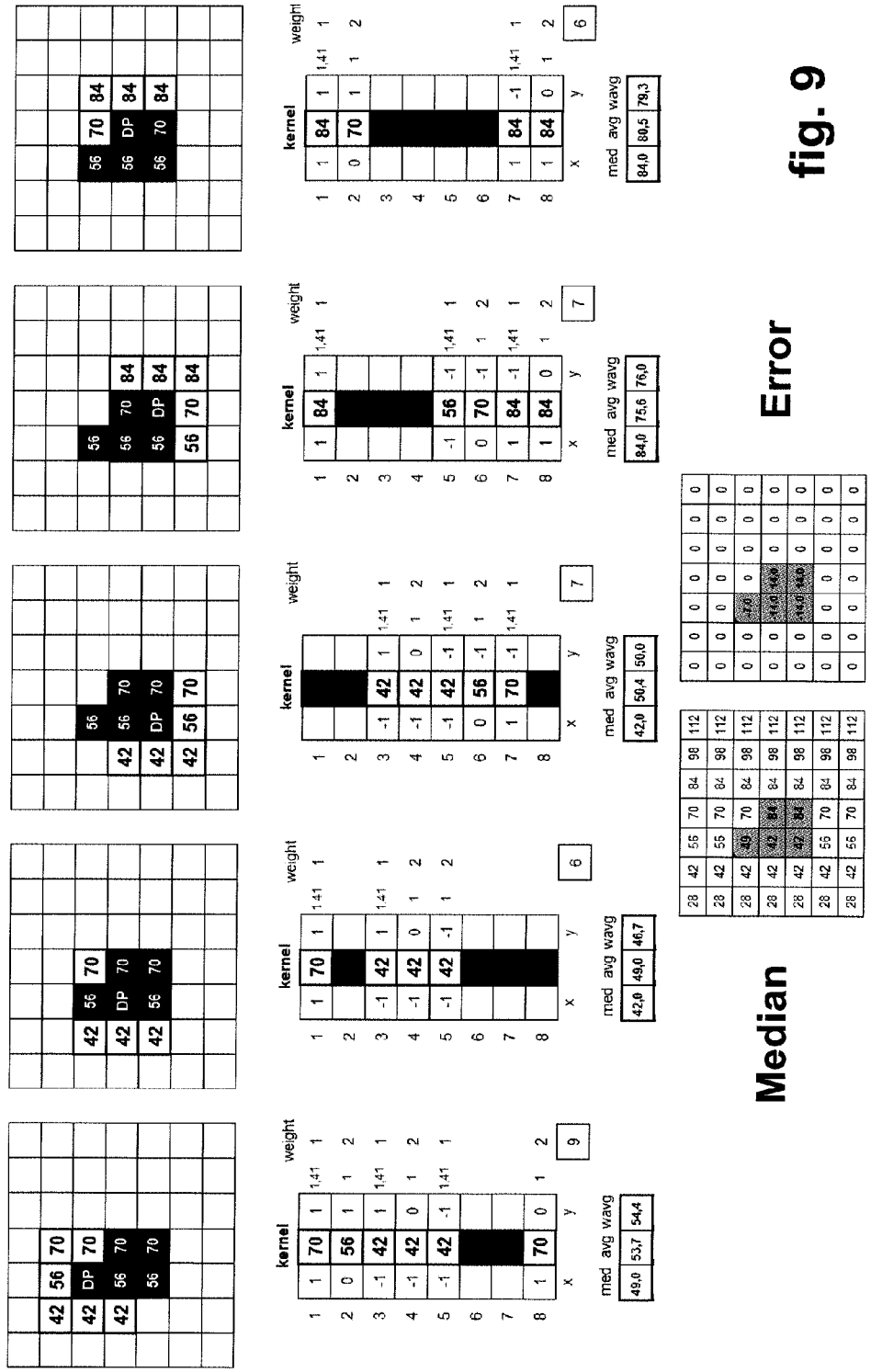
FIG. 9 represents an example of a direct neighbor kernel median defective cluster reconstruction and its reconstruction-error for the 0 degrees local data patch shown in FIG. 8.

FIG. 9 represents an example of a direct neighbor kernel median defective cluster reconstruction and its reconstruction-error for the 0 degrees local data patch shown in FIG. 8.

The simulated local data patch showing a linear slope with horizontally increasing signals from left to right due to a locally constant, zero degree signal-gradient vector is represented in combination with its directed, 5 defective pixels cluster overlay. The non defect impacted image-data, obtained without the cluster-defect, are shown as reference signal data. This image-data patch is subjected to a Direct Neighbor Defective Cluster Reconstruction operation.

Since 5 image-data pixels are impacted by the defective cluster a direct neighbor reconstruction value must be determined for each of them. An 8 pixels (3×3) direct neighbor kernel is centered to each of these 5 defective image pixels. The shown consecutive reconstruction kernels named: DN R1 to DN R5 represent the different geometries of the various residual direct neighbor kernels which are required to reconstruct the cluster impacted local image data. The shape of the defective cluster and the reconstruction point determine the required geometry of the kernel. This generates five different, residual direct neighbor kernel geometries each consisting of a different number of remaining kernel locations:

DN R1 (6 out of 8 for a complete DN-kernel) missing the locations: 6 and 7
DN R2 (4) missing the locations: 2, 6, 7 and 8
DN R3 (5) missing the locations: 1, 2 and 8
DN R4 (5) missing the locations: 2, 3 and 4
DN R5 (4) missing the locations: 3, 4, 5, 6
The calculation example shows how three different reconstruction values: the median, the average and the weighed-average are calculated for the image-data set associated with the residual reconstruction kernel. This way the set of 6 image-data spatially associated with the remaining DN R1 kernel locations: 70, 70, 56, 42, 42 and 42 are loaded into the vertically listed, kernel-data table and the obtained reconstruction values after applying the 3 different reconstruction algorithms are:
median statistical filtering: 49 (7 units less than the reference image-data 56)
spatial convolution average: 53.7
spatial convolution weighed-average: 54.4

The median reconstructed value of 49 is inserted as the replacement value for the first reconstructed defective pixel of the cluster in the Median reconstruction table shown at the bottom. The difference of −7 signal-units between the obtained reconstruction value 49 and its corresponding reference image-data 56 is inserted in the reconstruction Error table presented right next to it. Repeating this defective pixel reconstruction process for the other four defective cluster pixels completes the direct neighbor kernels based cluster reconstruction process. As seen from the end resulting cluster Error table three vertically arranged reconstructed pixels on the left hand side reveal replacement values which are lower than the reference image data. The two other vertically arranged reconstructed pixels on the right hand side reveal replacement values which are higher than the reference image data. This observation can be explained by the fact that each of the residual direct neighbor reconstruction kernels for the three left side cluster-pixels has a center-of-mass which is drawn towards the lower signals side. The residual reconstruction kernels for the two other defective cluster pixels on the right side each have a center-of-mass which is drawn towards the higher signals side. The root cause for this asymmetrically distorted geometry of the residual direct neighbor kernels is the fact that the other defective cluster pixels, often grouped in one direction as seen from the reconstruction point, are forcing the missing kernel locations necessary to maintain kernel symmetry, to be excluded due to the invalid data state of their associated local image-data.

Figure 10:
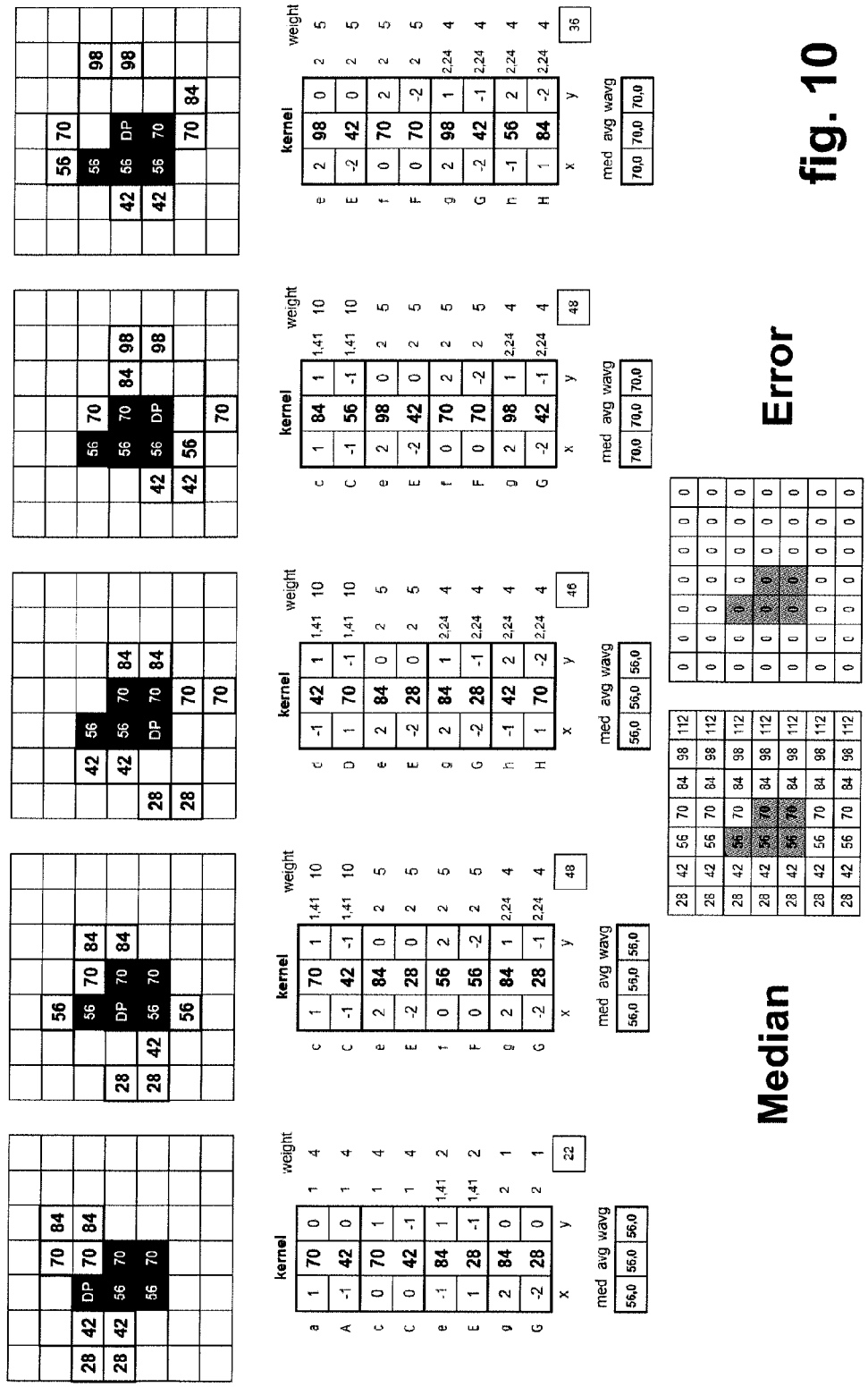
FIG. 10 represents an example of a center symmetrical pair kernel median defective cluster reconstruction and its reconstruction-error for the 0 degrees local data patch shown in FIG. 8.

FIG. 10 represents an example of a center symmetrical pair kernel median defective cluster reconstruction and its reconstruction-error for the 0 degrees local data patch shown in FIG. 8.

The same defective cluster overlaid local image data patch as used in FIG. 9 is subjected to Center Symmetrical Pair Defective Cluster Reconstruction now.

This time four different adaptive 4 CSPair reconstruction kernel geometries are necessary to reconstruction the entire five defective pixels cluster. The defective cluster reconstruction requires the following kernel geometries, each composed of the follow 4 center symmetrical pairs, for:
CSP R1 (pairs: aA, cC, eE and gG)
CSP R2 and CSP R4 (pairs: cC, eE, fF and gG)
CSP R3 (pairs: dD, eE, gG and hH)
CSP R5 (pairs: eE, fF, gG and hH)
After loading the above adaptive 4 CSPair reconstruction kernels with their spatially associated non-defective image data and processing that data with the three different reconstruction algorithms (the median, the average and the weighed average), the reconstructed cluster's replacement values and reconstruction errors obtained for each of the three different algorithms used, clearly indicate that a defective pixel cluster located in linear slope data can be perfectly reconstructed by means of the center symmetrical reconstruction approach since the calculated results match exactly with the reference image-data values: 56 and 70.

FIG. 11 shows the difference between a center symmetrical pair kernel-median and a direct neighbor kernel median defective cluster-reconstruction and the differences between their reconstructed cluster-errors calculated in FIG. 9 and FIG. 10.

The cluster reconstruction results obtained for the simulated zero degree signal-gradient vector controlled linear signal-slope image-data patch with the direct neighbor kernel median based calculation in FIG. 9 and those obtained with the adaptive 4 central symmetrical pair kernel median based calculation in FIG. 10 are presented side-by-side for comparison.

The three-dimensional XYS residual direct neighbor kernel reconstructed image-data view shows how the linear signal slope is affected by the reconstruction of the defective 5 pixels cluster.

Direct neighbor based cluster reconstruction leads to defective pixel replacement values which are below and above the normal slope signals as indicated by the differential DN Error view and by the local deviations from the linear slope, represented by the diagonal line in the slope-plane side-view. The two-dimensional top-view corresponds best with the regular representation of a direct radiography image. The impact of the erroneous direct neighbor reconstruction is reflected here by the dented disturbances of the iso-contours, the virtual lines interconnecting the pixels with identical image-data, due to the sudden local increase of the signal-gradient at the cluster location.

Looking at the two- and three-dimensional representations of the central symmetrical Pair reconstructed defective cluster, all of the above mentioned, artifacts induced by the poorly performing direct neighbor cluster reconstruction have completely disappeared.

The perfect geometrical balance of the center symmetrical pairs around the reconstruction points of the various adaptive CSP kernels used is the main reason for this artifact-free defective cluster reconstruction obtained here.

The invention claimed is:

1. A method for correcting defective pixel artifacts in a direct radiography image comprising executing, for a defective pixel, the steps of:
    gathering information on a defective state of image pixels surrounding the defective pixel;
    composing an adaptive reconstruction kernel by combining a set of pair-wise arranged kernel locations which correspond to non-defective pixels in a vicinity of the defective pixel;
    obtaining image data associated with the set of pair-wise arranged kernel locations in the adaptive reconstruction kernel;
    processing the associated image data along with kernel data using a reconstruction algorithm to calculate a replacement value for image data of the defective pixel; and
    replacing the defective pixel image data with the replacement value; wherein the adaptive reconstruction kernel includes an even number of non-defective, center symmetrical kernel-pair locations relative to a center of the adaptive reconstruction kernel and is added to a center symmetrical pair kernels structure.

2. The method according to claim 1, wherein the reconstruction algorithm performs a statistical filtering process on the image data spatially associated with the set of pair-wise arranged kernel locations in the adaptive reconstruction kernel.

3. The method according to claim 1, wherein the reconstruction algorithm performs a spatial convolution process on the image data spatially associated with the set of pair-wise arranged kernel locations in the adaptive reconstruction kernel using associated kernel weights.

4. The method according to claim 3, wherein the spatial convolution process includes calculating a weighted average value of the image data associated with the adaptive reconstruction kernel using corresponding kernel weights.

5. The method according to claim 4, wherein weights of the non-defective, center symmetrical kernel-pair locations relative to the center of the adaptive reconstruction kernel in the adaptive reconstruction kernel are determined based on a relative distance model wherein a kernel location weight decreases with an increasing distance between the kernel location and the center of the adaptive reconstruction kernel.

6. The method according to claim 1, wherein the center symmetrical kernel-pair locations are composed by order-consecutively selecting a predetermined number of kernel-pair candidates from a center symmetrical pair model based on the defective state of kernel-pair associated sensor pixels.

7. The method according to claim 6, wherein the center symmetrical pair model is arranged as an order-sorted set of the kernel pair candidates geometrically defined by eccentricities and angular directions relative to the center of the adaptive reconstruction kernel.

8. The method according to claim 7, wherein the center symmetrical pair eccentricity is defined such that a distance from the center of the adaptive reconstruction kernel does not decrease with sorting order.

9. The method according to claim 7, wherein the center symmetrical pair angular directions are mutually perpendicular per set of two order-sorted kernel pairs candidates.

10. The method according to claim 1, wherein information on the defective state of the image pixels surrounding the defective pixel is derived from a defective pixel locations structure and is merged with image position information derived from the center symmetrical pair kernels structure to create an image-offsets structure that is used during the reconstruction.

11. A non-transitory computer readable medium comprising computer executable program code adapted to carry out, when the computer executable program code is executed on a computer, the steps of claim 1.

* * * * *